United States Patent Office 3,357,443
Patented Dec. 12, 1967

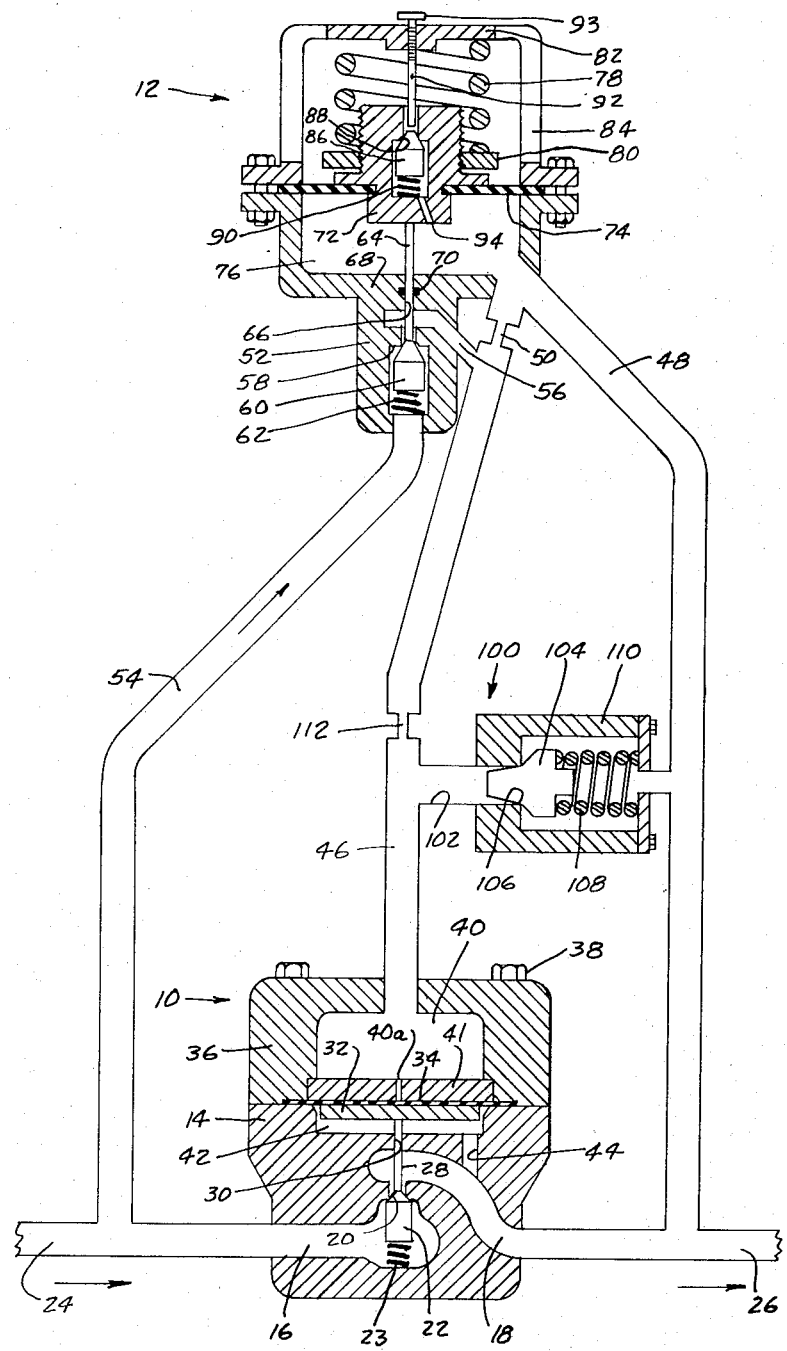

3,357,443
FLUID PRESSURE REGULATOR
Richard S. Brumm, El Cerrito, Calif., assignor to Grove Valve and Regulator Company, Oakland, Calif., a corporation of California
Filed Mar. 15, 1965, Ser. No. 439,624
11 Claims. (Cl. 137—116.5)

This invention relates to a fluid pressure regulator and more particularly, to a compensating dome loader for a pressure regulator which is responsive to the pressure downstream of the main regulator valve.

Others have provided pressure regulators with a pressure-responsive main regulator valve that is dome loaded with the output from a pilot valve. In certain of these regulators, the pilot valve is operated in response to a reduction of the downstream pressure being controlled to deliver a fluid under pressure to the dome of the main regulator valve, but considerable difficulty has been experienced in such valves in the control of the dome pressure. Specifically, others have failed to achieve a rapid and substantial increase in dome pressure in order to insure positive operation of the main regulator valve without causing dome pressure to build up excessively to a level that will prevent or retard closing of the valve when the desired downstream pressure is reached.

It is, therefore, an object of this invention to provide a compensating dome loader that insures rapid dome loading of the main regulator valve.

It is a further object of this invention to provide means for limiting the dome pressure to a level that will insure closing of the valve when desired.

It is a further object of this invention to provide a pressure regulator with means for preventing excessive build-up of downstream pressure in the event of a leak in either the compensating control valve or the main valve.

It is a further object of this invention to provide a dome loading compensator with means to restrict flow to and from the main dome.

It is a further object of this invention to provide a dome loaded pressure regulator having means to minimize hunting or cycling of the main regulator valve.

In carrying out this invention, I provide a spring-loaded compensator to control a main regulator valve which is installed in a fluid line connected to a source of high pressure fluid. The compensator valve has its inlet connected to the upstream side of the main regulator valve, and its loading spring is opposed by a pressure-responsive member, which is exposed to the downstream pressure. A conduit having an orifice restriction therein is connected between the dome of the main valve and the downstream line, and the compensator valve discharges into this conduit intermediate the dome and the orifice restriction.

Thus, when the compensator valve opens in response to a reduction in downstream pressure below the desired level, it discharges into both the downstream line and the main regulator dome, but since the orifice restricts flow to the downstream line, a pressure build-up results in the main regulator dome. It is this increased pressure in the regulator dome that opens the main valve, being opposed by downstream pressure, plus the force resulting from the pressure differential across the main valve itself. Then, when the desired downstream pressure is reached and the main valve is closed, the dome pressure will bleed off through the orifice toward equalization with the downstream pressure.

This regulator operates satisfactorily in most conditions, but in certain instances, as when a downstream valve remains open, flow through the main regulator valve may reach full capacity without satisfying the demand. In such event, a greater flow will be diverted through the still-open compensator valve, and because of the orifice between the compensator and the downstream conduit, pressure will continue to build up in the dome to a level approaching the upstream pressure. Then, when the desired downstream pressure is reached, the dome pressure acting against the diaphragm to hold the main valve open may be too great to overcome, and the main regulator valve will remain open until the excessive pressure is bled through the orifice into the downstream line. The resultant delay in operation of the main valve could, of course, produce an excessive downstream pressure.

In order to overcome this difficulty, I provide a direct conduit from the dome of the downstream line with a relief valve therein set to open before the differential between dome pressure and downstream pressure becomes excessive.

Other objects and advantages of this invention will become apparent from the description following when read in conjunction with the accompanying drawing, wherein:

The sole figure is a schematic illustration, partially in section of a pressure reducing regulator valve embodying features of this invention.

The drawing shows a diaphragm type main regulator valve 10 which is loaded by a compensator valve 12. The main regulator valve includes a body 14 formed with inlet and outlet flow passages 16 and 18, respectively. A conical valve seat 20 is formed in the body and a movable conical valve member 22 cooperates therewith, preferably being urged toward the seat by a spring 23. The inlet passage 16 is connected through a main valve inlet line 24 to a high pressure source (not shown) of air or other gas, and the outlet passage 18 is connected through an outlet line 26 to a downstream pressure system which is to be maintained at some predetermined level of pressure lower than the inlet pressure from the source. When the valve member 22 is displaced from the seat 20, gas may flow directly from the inlet line 24 to the downstream line 26.

The valve member 22 is provided with a valve stem 28 which is avially slidably received in a bore 30 formed in the body 14. The upper end of the stem is attached to, or simply engage by, a rigid diaphragm plate 32, which in turn is fastened to, or engaged by, a flexible diaphragm 34. The outside edge of the diaphragm is clamped tightly between the body 14 and a dome, or cap, 36, which is secured to the body 14 by suitable means such as cap screws 38. The dome chamber 40 is formed above the diaphragm 34 and receives the controlling pressure fluid from the compensating loader 12 in a manner hereinafter to be described. The control pressure is directed against the upper surface of the diaphragm 34 through a damping orifice 40a in an orifice plate 41. An opposing chamber 42 formed beneath the diaphragm is in direct communication wtih the downstream line 26 through a sensing passage 44 in the valve body. Thus, the diaphragm is urged in one direction by dome pressure in the chamber 40, and in the other direction by downstream pressure in the balancing chamber 42.

The dome or working chamber 40 of the main valve 10 is connected by a loading conduit 46 to the downstream line, and this connection may be effected through a compensator sensing conduit 48 connected between the downstream line 26 and the compensating loading valve 12. Interposed in the loading conduit 46 is an orifice restriction 50.

The compensator valve 12 includes a body 52 with an inlet flow conduit 54 which is connected to the upstream line 24 and, hence, the pressure source (not shown). An outlet or discharge flow passage 56 discharges into the dome loading conduit 46 intermediate the dome 40 and the sensing conduit 48. The compensator valve 12 is provided with a suitable valve seat 58, which is adapted for engagement by a movable valve plug 60 which may be biased into sealing engagement by means of a spring 62. Thus, when the pilot valve member 60 is displaced from the seat 58, gas may flow from the source of pressure fluid in the inlet line 24 to the main regulator dome chamber 40 and, simultaneously, through the orifice 50 and sensing conduit 48 to the downstream line 26.

Actuation of the pilot valve member 60 is under control of a valve stem 64 which is axially slidable in a bore 66 formed through a wall 68 of the compensator valve body 52, a seal ring 70 being provided to prevent leakage from the discharge duct 56. The stem 64 engages between the valve plug 60 and a valve actuator 72 secured to a diaphragm 74 that extends across a sensing chamber 76 in the valve body 52.

The sensing conduit 48 brings the sensing chamber 76 into communication with the downstream line 26 and the downstream pressure acting against the bottom of the diaphragm is opposed by a fixed force such as the spring 78. Preferably the spring force is adjusted by any suitable means, such as the nut 80 threaded on the actuator. The top of the spring engages a plate 82 carried on an open frame 84. Thus, when downstream pressure falls below the level determined by the spring force, the spring 78 will force the diaphragm down so that the rod 64 pushes the compensator valve 60 open and upstream pressure discharges through line 56. As previously noted, this high pressure discharge flows into the downstream line through orifice 50 and into the dome 40 through line 46.

In order to prevent the downstream pressure from becoming excessive, I also provide a relief valve 86 in the actuator body 72 that is normally urged into closed position against a valve seat 88 as by means of a spring 90. Depending from the stationary plate 82 is a rod 92 that is engageable by the uppper face of the valve plug 86 when it moves upward with the actuator body 72. Thus, if the downstream pressure builds up, it may overcome the spring 78 to force the actuator and, hence, the valve seat 88 upward. Then, when the rod 92 is engaged by the valve 86, the valve seat moves away from the valve to permit relief of downstream pressure from the line 48, through the passage 94 and the valve seat 88 to the atmosphere. The rod 92 preferably adjustably mounted for axial positioning, as by means of a nut 93.

When the compensator valve 60 is opened to discharge upstream pressure into the loading conduit 46, the orifice 50 restricts flow to the downstream line 48 and, as a result, there is a pressure build-up in the line 46 and, hence, in the dome 40. The flow that does pass through the orifice 50 may be adequate to compensate for small deviations from the desired downstream pressure, but where there is any substantial demand, the pressure build-up in the dome 40 will overcome the downstream pressure opposing it and cause the main valve 22 to open so that there is direct flow from the upstream line 24 to the downstream line 26.

Then when the downstream pressure is again increased near the desired level, the compensator diaphragm 74 commences to lift and begins to close the compensator valve 60. As a result, discharge into the line 46 decreases and, eventually, some of the flow through the orifice 50 originates from the dome 40. Consequently, dome pressure decreases until the downstream pressure overcomes the diaphragm 34 to close the main valve 22. The compensator valve 60 continues to close and the dome pressure continues to bleed through orifice 50 until downstream pressure is equalized.

The system just described will perform satisfactorily under many conditions. However, where there is a substantial pressure demand, as when a downstream valve is held open, another problem may be encountered. In such event, flow through the main valve seat 20 may reach full capacity without satisfying the demand and further increase in flow, therefore, will be directed through the line 54 and the compensator valve 60. As a result, the orifiice 50 will tend to cause a further pressure build-up in the regulator dome 40. Since the dome pressure is opposed by downstream pressure in operation of the main valve 22, an excessive pressure differential between the two will retard closing of the valve, perhaps resulting in over-compensation to an excessive downstream pressure. Even though this excess pressure is ultimately relieved through the compensator relief valve 86, the delay in main valve operation will cause, in any event, a waste of fluid from the pressure source.

In order to prevent the occurrence of such excessive pressure differential, I provide a differential relief valve 100 in a by-pass duct 102 connected between the dome and downstream line. As shown, the by-pass line 102 may be connected between loading duct 46 and the compensator valve sensing duct 48. The relief valve may be of any suitable type including, for example, a valve plug 104 which is urged against a valve seat 106 by means of a pre-loaded spring 108 within a valve body 110. The force of the spring is augmented by downstream pressure opposing the dome pressure acting against the leading face of the valve plug 104. Thus, the spring actually sets a value of differential pressure between dome and downstream and not merely absolute pressure. The pressure differential valve selected will be such that will insure positive operation of the valve 22 to open but not so much that closing will be delayed an excessive period of time while the dome is bled off through orifices 112 and 50.

As an additional feature of this invention, I may provide a second orifice 112 in the loading conduit 46 in order to restrict rate of flow into and out of the regulator dome 40. This orifice restriction cooperates with the orifice 40a in the dome plate 41 to reduce the tendency of the diaphragm to fluctuate and cause a cycling and hunting operation of the main valve 22. Additionally, the orifice 112 restricts flow to the by-pass conduit 102, and therefore, reduces the capacity requirement of the relief valve 100.

Summarizing the operation of the device just described, the compensator valve spring 78 is set at a force to overcome downstream pressure, as sensed below the diaphragm 74, should it fall below the desired level. If such condition occurs, the compensator valve 60 is opened and upstream pressure is discharged into the loading conduit 46. Some of this upstream pressure flows directly to the downstream line 26 to the extent permitted by the capacity of the orifice 50. If the downstream pressure deficiency is slight, the flow through orifice 50 may bring it to desired level. Otherwise, the dome pressure will build up until the downstream pressure below the main diaphragm 34 is overcome, excessive build-up being prevented by by-pass relief valve 100.

Then, when the proper downstream level is approached, the compensator valve 60 will commence closing and its discharge reduced. As a result, the dome pressure will decrease until the main valve 22 closes.

This invention has been described in conjunction with a preferred embodiment thereof. However, it is to be understood that modification and changes therein may be made by those skilled in the art, without departing from the spirit and scope of this invention as defined by the claims appended hereto.

Having described my invention, I claim:

1. In combination with a fluid pressure regulator including a valve member and a main pressure-responsive member operating said valve member,
   a compensator device for operating said main pressure-responsive member comprising:
      a compensator valve,
      a compensator pressure-responsive member for operating said compensator valve, means connecting said compensator pressure-responsive member to the downstream side of the fluid pressure regulator, duct means connecting the opposite sides of said main pressure-responsive member, an orifice in said duct means, a load conduit connecting the discharge of said compensator valve to one side of said main pressure-responsive member, and a normally closed loaded relief valve connecting the opposite sides of said main pressure-repsonsive member and constructed and arranged to limit the amount by which the pressure on said one side of said main pressure-responsive member exceeds the pressure on the other side.

2. The fluid pressure regulator defined by claim 1 including:

a damping orifice in said load conduit.

3. A dome loading compensator for a fluid pressure regulator valve having a dome chamber and a main pressure-responsive member movable in said dome chamber, a loading conduit connected to said dome chamber on one side of said main pressure-responsive member and a main sensing duct connecting the other side of said main pressure-responsive member to the downstream line, said dome loading compensator comprising:

a compensator valve, the inlet and outlet of said compensator valve being connected to the upstream line and loading conduit, respectively, a pressure sensing device to effect operation of said compensator valve, sensing duct means connecting said pressure sensing device to the downstream line, bleed duct means connecting opposite sides of said main pressure-responsive member, an orifice in said bleed duct means, and a normally closed loaded relief valve connecting said one side of said dome chamber to the downstream line, said relief valve being constructed and arranged to limit pressure differential between the dome chamber and the downstream line.

4. The combination defined by claim 3 including:

a normally closed vent valve between the compensator valve sensing chamber and a zone of low pressure, said vent valve being connected to said compensator pressure-sensing device member and being adapted to open under excess downstream pressure conditions.

5. The combination defined by claim 4 including:

a damping orifice in said loading conduit.

6. A dome loading device for a fluid pressure regulator including a valve member, a main pressure-responsive member for operating said valve member, means for directing fluid from the downstream side of said valve member to one side of said main pressure-responsive member, and a pressure dome on the other side of said main pressure-responsive member, said dome loading device comprising:

a compensator valve, a second pressure-responsive member for operating said compensator valve, means biasing said second pressure-responsive member to urge said compensator valve open position, a conduit adapted for connection between the downstream side of said main valve and said second pressure-responsive member in opposition to said biasing means, a loading conduit connected between said dome and the downstream side of said main valve, an orifice in said loading conduit, means connecting the discharge of said compensator valve to said loading conduit intermediate said dome and said orifice, means for connecting the inlet of said compensator valve to the upstream side of said main valve, a by-pass duct connecting said dome to the downstream side of said main valve, and a loaded relief valve in said by-pass duct to limit pressure differential between said dome and said downstreams side.

7. The dome loading device defined by claim 6 including:

a second orifice in said loading conduit intermediate the discharge connection from said compensator valve and said dome.

8. The dome loading device defined by claim 6 including:

a downstream pressure relief valve in said compensator valve conditioned to be opened when said biasing means is overcome, said downstream pressure relief valve being connected between the downstream line and a zone of low pressure.

9. A dome loading device for a fluid pressure regulator including a valve member, a main pressure-responsive member for operating said valve member, means for directing fluid from the downstream side of said valve member to one side of said main pressure-responsive member, and a pressure dome on the other side of said main pressure-responsive member, said dome loading device comprising:

a compensator valve, a second pressure-responsive member for operating said compensator valve, means biasing said second pressure-responsive member to urge said compensator valve into open position, a conduit adapted for connection between the downstream side of said main valve and said second pressure-responsive member in opposition to said biasing means, a loading conduit connected between said dome and the downstream side of said main valve, a first orifice in said loading conduit, means connecting the discharge of said compensator valve to said loading conduit intermediate said dome and said orifice, means for connecting the inlet of said compensator valve to the upstream side of said main valve, a by-pass duct connecting said dome to the downstream side of said main valve, a loaded relief valve in said by-pass duct to limit dome pressure to a predetermined differential in excess of the downstream pressure, and a second orifice in said loading conduit intermediate the discharge connection from said compensator valve and said by-pass duct.

10. The dome loading device defined by claim 9 wherein:

said relief valve is biased closed by downstream pressure fluid augmented by means asserting a predetermined force, and is urged open by dome pressure fluid.

11. A dome loading device for a fluid pressure regulator including a valve member, a main pressure-responsive member for operating said valve member, means for directing fluid from the downstream side of said valve member to one side of said main pressure-responsive member, and a pressure dome on the other side of said main pressure-responsive member, said dome loading device comprising:

a compensator valve, a second pressure-responsive member for operating said compensator valve, means biasing said second pressure-responsive member to urge said compensator valve into open position, a conduit adapted for connected between the downstream side of said main valve and said second pressure-responsive member in opposition to said biasing means whereby an increase in pressure on the downstream side of the main valve causes a movement of the second pressure responsive member to move the compensator valve to closed position, a loading conduit connected between said dome and the downstream side of said main valve, an orifice in said loading conduit, means connecting the discharge of said compensator valve to said loading conduit intermediate said dome and said orifice, means for connecting the inlet of said compensator valve to the upstream side of said main valve, and a downstream pressure relief valve conditioned to be opened by a further movement of said second pressure-responsive member in opposition to said biasing means after said compensator valve is closed, one element of said downstream pressure relief valve being secured to and movable with said second pressure-responsive member, a lost motion connection between said second pressure-responsive member and said compensator valve to allow said further movement of said second pressure-responsive member, and stop means engageable with a complementary element of said downstream pressure relief valve to restrict movement thereof and open said relief valve, said downstream pressure relief valve being connected between the downstream line and a zone of low pressure.

References Cited
UNITED STATES PATENTS

| | | | |
|---|---|---|---|
| 548,172 | 10/1895 | Bastian | 137—116.5 |
| 2,067,510 | 1/1937 | Spence | 137—489.5 |
| 2,067,953 | 1/1937 | Spence | 251—30 |
| 2,309,848 | 2/1943 | King | 137—489.5 |

M. CARY NELSON, *Primary Examiner.*

R. J. MILLER, *Assistant Examiner.*